United States Patent
Imbimbo et al.

(10) Patent No.: US 10,334,021 B2
(45) Date of Patent: Jun. 25, 2019

(54) RETAINED DATA HANDLING AT DIFFERENTIATED RESPONSE TIMES

(75) Inventors: Amedeo Imbimbo, Caivano (IT); Giuseppe Carnevale, Naples (IT); Romina Pancione, Mercato San Severino (IT)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 534 days.

(21) Appl. No.: 14/235,568

(22) PCT Filed: Aug. 1, 2011

(86) PCT No.: PCT/SE2011/050974
§ 371 (c)(1),
(2), (4) Date: Jan. 28, 2014

(87) PCT Pub. No.: WO2013/019152
PCT Pub. Date: Feb. 7, 2013

(65) Prior Publication Data
US 2014/0195617 A1    Jul. 10, 2014

(51) Int. Cl.
H04L 29/06    (2006.01)
H04L 29/08    (2006.01)
G06F 16/185    (2019.01)

(52) U.S. Cl.
CPC ............ *H04L 67/10* (2013.01); *G06F 16/185* (2019.01); *H04L 63/308* (2013.01)

(58) Field of Classification Search
CPC .. H04L 67/10; H04L 63/308; G06F 17/30221
(Continued)

(56) References Cited

U.S. PATENT DOCUMENTS 5,995,708 A * 11/1999 Corey ............... H04N 7/17318
                                                         348/E5.008
7,376,681 B1 * 5/2008 Todd ................. G06F 17/30067
                                                         707/205
(Continued)

FOREIGN PATENT DOCUMENTS

EP    0573252 A2    12/1993
KR    20080102828 A    11/2008
(Continued)

OTHER PUBLICATIONS

ETSI Technical Committee Lawful Interception, "Lawful Interception (LI); Retained Data; Requirements of Law Enforcement Agencies for Handling Retained Data", Technical Specification, ETSI TS 102 656 V1.2.1, Dec. 1, 2008, pp. 1-18, ETSI, France.
(Continued)

*Primary Examiner* — Krista M Zele
*Assistant Examiner* — Timothy Sowa
(74) *Attorney, Agent, or Firm* — Patent Portfolio Builders, PLLC

(57) ABSTRACT

The present invention relates to a method for handling response times in a communication system comprising at least one data retention system having at least one storage space for retained data. The at least one storage space has a defined response time (high, medium, low) for delivering retained data. The method comprises the following steps: —Receiving a request for retained data from an authorized organization to the at least one data retention system, which request comprises a specified data type and a retention time range —Dividing in the at least one data retention system, the received retention time range into at least one time segment each corresponding to one defined response time —Delivering an acknowledge message from the at least one data retention system to the authorized organization, which
(Continued)

message comprises response and identification information corresponding to the at least one divided time segment.

17 Claims, 7 Drawing Sheets

(58) Field of Classification Search
USPC ........................................................ 709/204
See application file for complete search history.

(56) References Cited

U.S. PATENT DOCUMENTS

| | | | | |
|---|---|---|---|---|
| 7,606,934 B1* | 10/2009 | Vengerov | ............... | G06F 3/0611 |
| | | | | 706/21 |
| 7,752,437 B1* | 7/2010 | Thakur | ................... | H04L 12/24 |
| | | | | 370/229 |
| 2004/0122802 A1 | 6/2004 | Allen et al. | | |
| 2005/0108435 A1* | 5/2005 | Nowacki | ................ | H04L 51/066 |
| | | | | 709/246 |
| 2006/0168231 A1* | 7/2006 | DiPerna | ................ | H04L 67/325 |
| | | | | 709/226 |
| 2006/0271731 A1* | 11/2006 | Kilian | ................... | G06F 3/0611 |
| | | | | 711/108 |
| 2008/0172419 A1 | 7/2008 | Richards et al. | | |
| 2008/0243796 A1* | 10/2008 | Prahlad | ............. | G06F 17/30442 |
| 2008/0301282 A1* | 12/2008 | Coleman | ................ | G06Q 30/02 |
| | | | | 709/224 |
| 2009/0016526 A1* | 1/2009 | Fiatal | ................. | H04L 63/0428 |
| | | | | 380/255 |
| 2009/0037489 A1 | 2/2009 | Grundler et al. | | |
| 2009/0135007 A1* | 5/2009 | Donovan | ......... | G08B 13/19645 |
| | | | | 340/540 |
| 2009/0234845 A1* | 9/2009 | DeSantis | ............... | H04L 43/026 |
| | | | | 707/5 |
| 2010/0017486 A1* | 1/2010 | Yokoyama | ............... | H04L 69/26 |
| | | | | 709/206 |
| 2010/0017523 A1* | 1/2010 | Yoshiuchi | .......... | H04N 21/2407 |
| | | | | 709/228 |
| 2010/0027469 A1* | 2/2010 | Gurajala | .............. | G06Q 30/016 |
| | | | | 370/328 |
| 2010/0056076 A1* | 3/2010 | Mazzara, Jr. | .......... | H04H 60/39 |
| | | | | 455/90.1 |
| 2010/0131470 A1* | 5/2010 | Schmidt | ................... | H04L 51/04 |
| | | | | 707/665 |
| 2011/0010664 A1* | 1/2011 | Das | ......................... | G06F 11/32 |
| | | | | 715/810 |
| 2011/0040937 A1* | 2/2011 | Augenstein | ........... | G06F 1/3203 |
| | | | | 711/117 |
| 2011/0078281 A1* | 3/2011 | Imbimbo | .............. | H04W 12/02 |
| | | | | 709/217 |
| 2011/0244916 A1* | 10/2011 | Attanasio | ............ | H04M 3/2281 |
| | | | | 455/525 |
| 2011/0252214 A1* | 10/2011 | Naganuma | ........... | G06F 3/0607 |
| | | | | 711/170 |
| 2012/0096145 A1* | 4/2012 | Le | ......................... | G06Q 50/265 |
| | | | | 709/224 |
| 2012/0131302 A1* | 5/2012 | Nasu | ...................... | G06F 3/0604 |
| | | | | 711/171 |
| 2012/0317249 A1* | 12/2012 | Salsburg | ............... | G06F 9/5072 |
| | | | | 709/220 |

FOREIGN PATENT DOCUMENTS

| | | | | | |
|---|---|---|---|---|---|
| WO | WO 00/68841 | * | 5/2000 | ............ | G06F 17/30 |
| WO | 2007097667 A1 | | 8/2007 | | |
| WO | 2010048989 A1 | | 5/2010 | | |

OTHER PUBLICATIONS

ETSI Technical Committee Lawful Interception, "Lawful Interception (LI); Retained data handling; Handover interface for the request and delivery of retained data", Technical Specification, ETSI TS 102 657 V1.7.1, Oct. 1, 2010, pp. 1-109, ETSI, France.

ETSI Technical Committee Lawful Interception, "Directive 2006/24/EC of the European Parliament and of the Council", Official Journal of the European Union, Mar. 15, 2006, pp. L 105/54-L 105/63.

\* cited by examiner

PRIOR ART

RETAINED DATA HANDLING AT DIFFERENTIATED RESPONSE TIMES

TECHNICAL FIELD

The present invention generally relates to systems and methods and, more particularly, to mechanisms and techniques for handling response times for retained data.

BACKGROUND

In many countries the operators and Internet service providers are today obliged by legal requirements to provide stored traffic data generated from public telecommunication and Internet services for the purpose of detection, investigation and prosecution of crime and criminal offences including terrorism.

There are also a number of initiatives within the European Union (EU) to regulate the legal basis for data retention. The EU Parliament has recently adopted a set of amendments and by that approved the Council's proposed directive on data retention, see Directive 2006/24/EC of the European Parliament and of the Council of March 2006 on the retention of data. This proposal describes not only initial requirements, but also how an extension of the directive will be handled. Consequently, an essential part of the operator's effort to comply with current legislation will be to secure that processes and tools are adaptable to handle an expansion of the scope for data retention.

This clause presents the user requirements related to the retained data of telecommunications with the LEA being the user. The relevant terms are defined in clause 3.1. These user requirements are subject to national law and international treaties and should be interpreted in accordance with applicable national policies.

ETSI TS 102 657 V1.7.1 (2010-10) gives guidance for the delivery and associated issues of retained data of telecommunications and subscribers. It provides a set of requirements relating to handover interfaces for the retained traffic data and subscriber data by law enforcement and other authorized requesting authorities. The requirements are to support the implementation of Directive 2006/24/EC of the European Parliament and of the Council of 15 Mar. 2006 on the retention of data.

ETSI DTS/LI-00033 V0.8.1 contains handover requirements and a handover specification for the data that is identified in EU Directive 2006/24/EC on retained data.

The ERICSSON® AUTOMATIC DATA RETENTION SYSTEM DRS™ provides a solution for collecting, storing and delivering communication data generated by telecommunication and Internet services in public fixed and mobile networks. FIG. 1 belongs to the prior art and discloses the Handover Interfaces HIA 7 and HIB 8 between a Data Retention System DRS 2 at a Communication Service Provider CSP 1, and an Authorized Organization AO 3. The figure shows an Administration Function AdmF 4 used to handle and forward requests from/to the AO. A Mediation and Delivery function MF/DF 5 is used to mediate and deliver requested information. Storage 6 is used to collect and retain data from various Network elements. The interfaces through which the CSP receives requests from the Authorized Organization, and transmits responses and information are denoted as Handover Interfaces. The generic Handover Interfaces adopt a two port structure such that administrative request/response information and Retained Data Information are logically separated. The Handover Interface HIA 7 transports various kinds of administrative, request and response information from/to the Authorized Organization and the organization at the CSP which is responsible for Retained Data matters. The Handover Interface HIB 8 transports the retained data information from the CSP, to the Authorized Organization AO. The HIA and HIB interfaces may be crossing borders between countries. This possibility is subject to corresponding national law and/or international agreements.

Hierarchical Storage Management (HSM) is a data storage technique which automatically moves data between high-cost and low-cost storage media. HSM systems exist because high-speed storage devices, such as hard disk drive arrays, are more expensive (per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then copy data to faster disk drives when needed. In effect, HSM turns the faster disk drives into caches for the slower mass storage devices. The HSM system monitors the way data is used and makes best guesses as to which data can safely be moved to slower devices and which data should stay on the fast devices.

In a typical HSM scenario, data files which are frequently used are stored on disk drives, but are eventually migrated to tape if they are not used for a certain period of time, typically a few months. If a user does reuse a file which is on tape, it is automatically moved back to disk storage. The advantage is that the total amount of stored data can be much larger than the capacity of the disk storage available, but since only rarely-used files are on tape, most users will usually not notice any slowdown.

HSM is sometimes referred to as tiered storage and it is often used for deep archival storage of data to be held long term at low cost. Automated tape robots can silo large quantities of data efficiently with low power consumption.

In the Data Retention case, when the Authorized Organization AO 3 sends query requests towards the retention system 2, there could be cases where the response time could be differentiated for different subset of data to be returned:
   When different sets of data are stored in different performing storage devices 6; the resulting data could be sent to the AO with different response times;
   When different sets of data are stored in different retention systems (possible way to scale the ADRS solution); the resulting data from different retention system could have different response times.

A problem occurs when the agency sends a request to DRS which could send different result sets with different delays; in such case the agency is not aware in advance of this differentiated response times and will not be able to process the retrieved data in a controlled way.

SUMMARY

An aim of the invention is to overcome above identified limitations of the prior art. The invention focuses on introducing on the Handover Interfaces information enabling a split by a Data Retention system of query results in time segments which will be returned with different response times, depending on the time the Data Retention system needs to retrieve the related data. This will enable an Authorized Organization requesting the data to start processing the retrieved data in a controlled and predictable way.

The solution in one exemplified embodiment is a method for handling response times in a communication system comprising at least one data retention system having at least one storage space for retained data. The at least one storage space has a defined response time for delivering retained data. The method comprises the following steps:

A request for retained data is received from an authorized organization to the at least one data retention system. The request comprises a specified data type and a retention time range.

The received retention time range is divided in the at least one data retention system into at least one time segment each corresponding to one defined response time.

An acknowledge message is delivered from the at least one data retention system to the authorized organization. The message comprises response and identification information corresponding to the at least one divided time segment.

The solution in yet another exemplified embodiment is a Data Retention node, or any network node implementing such function, of a communication system comprising at least one storage space for retained data wherein the at least one storage space has a defined response time for delivering retained data, which node comprises:

means for receiving a request for retained data, which request comprises a specified data type and a retention time range, which node is characterized by;

means for dividing the received retention time range into at least one time segment each corresponding to one defined response time;

means for delivering an acknowledge message comprising response and identification information corresponding to the at least one divided time segment.

The solution in another exemplified embodiment is an authorization node, or any network node implementing such function, of a communication system which node comprises:

means for sending a request for retained data, which request comprises a specified data type and a retention time range, which node is characterized by;

means for receiving an acknowledge message comprising response and identification information corresponding to a divided time segment.

The solution in yet another exemplified embodiment is a computer program adapted to perform one or more of the steps in the method.

An object of the invention is facilitating controlled processing of retained data delivered at differentiated response times.

Some advantages of the invention are as follows:

An authorized organization will be aware in advance of differentiated response times expected to complete a query. The authorized organization will have the possibility to order a selective delivery of a specified segment through the information added in the first acknowledge message to a query request, adding more flexibility to the execution flow. The solution further prevents possible complaints from an authority perceiving differentiated delays on the query result reception and introduces suitable mechanisms to ensure the adherence to service level agreements between an agency and an operator.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
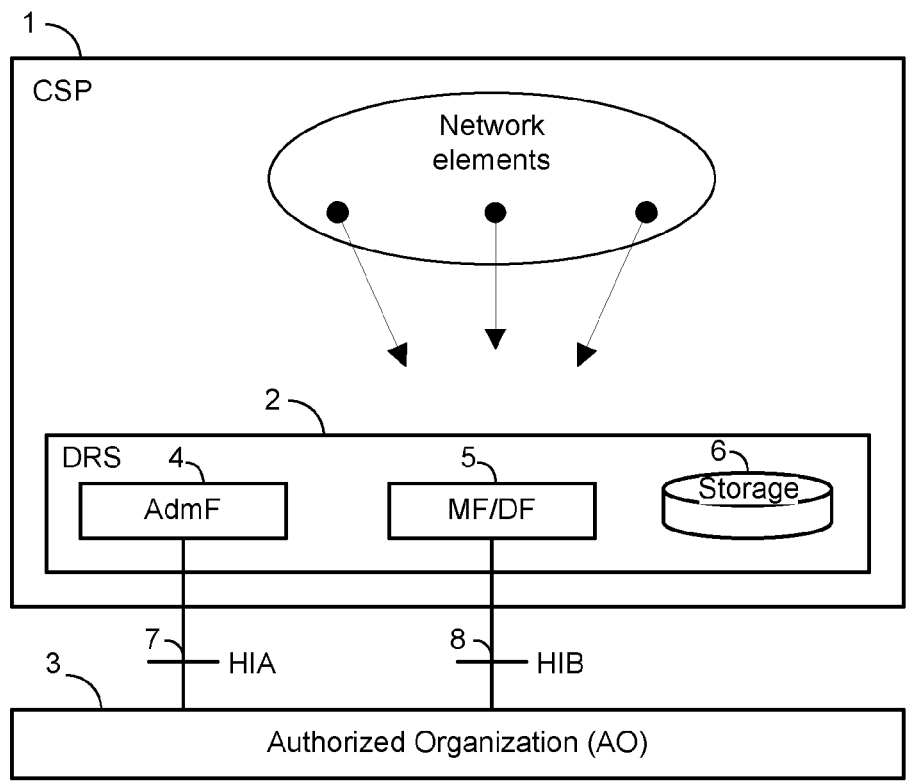
FIG. 1 is part of the prior art and discloses a block schematic illustration of a Data Retention System at a Communication Service Provider CSP attached to an Authorized Organization.
Figure 2:
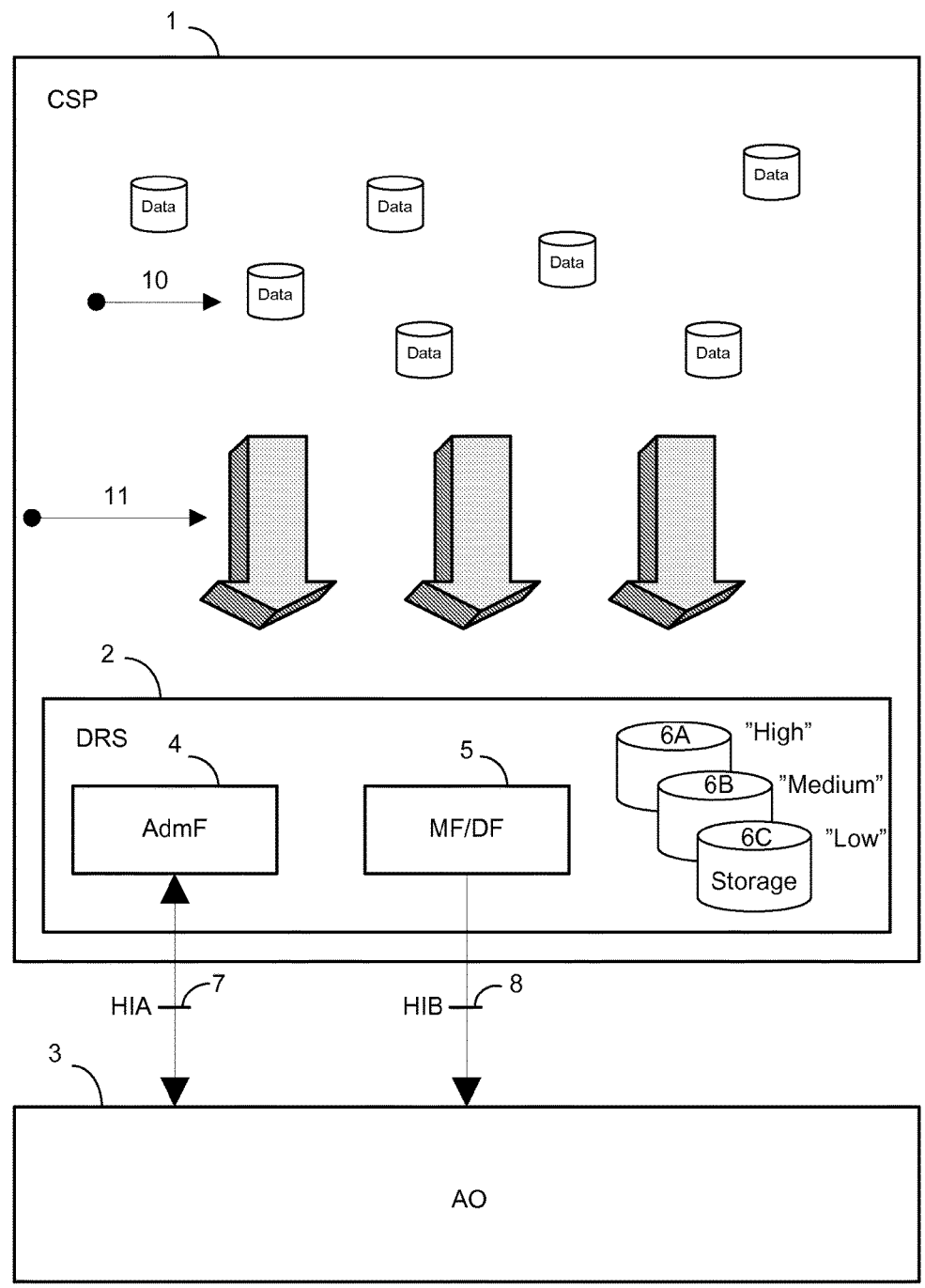
FIG. 2 is a block schematic illustration of a Data Retention System at a Communication Service Provider CSP attached to an Authorized Organization whereby different storage units in CSP are acting as data retention sources and wherein storage spaces in the Data Retention System for retained data has different defined response times for delivering retained data.

FIG. 2 is a block schematic illustration of a Data Retention System DRS 2 at a Communication Service Provider CSP 1 attached to an Authorized Organization AO 3. In this example manifold different sources 10 in the CSP are acting as data retention sources. The entities 1-8 have been explained earlier together with FIG. 1. The transportation of data from the data retention sources 10 to the MF/DF 5 is schematically shown in FIG. 2 with filled arrows 11. Data records are thereby transferred to the mediation function MF/DF 5 in the DRS 2, and data fulfilling configured filtering criteria are mediated from MF/DF to the Storage 6. Updating of the Storage depends on the policy regulating the notifications with the user, session or operator related data, from the data retention source towards the storage. A prerequisite for this embodiment is a tiered storage solution where data records have been transported from 10 to storage 6. The tiered storage solution assigns different data to different types of storage media, in this exemplified embodiment to different storage spaces 6A, 6B, 6C. In FIG. 2 the storage spaces 6A, 6B, 6C have been disclosed as three storage units but to be noted is that different storage spaces might as well be part of the same physical storage unit. Furthermore the number of storage spaces is just an example. In this example there are three components of the tiered storage strategy identified as:

Primary storage 6A. In the storage space 6A new data from high-performance, mission-critical applications and databases are stored. Access time is measured in milliseconds; storage media includes ultra-high performance flash or solid-state drives (SSD) and fiber channel (FC) storage.

Secondary storage 6B. In the storage space 6B older data are stored where an access time in seconds is allowed; storage media includes unified storage, capacity disks (SATA), and hybrids.

Long-term or archival storage 6C. In the storage space 6C older data with longer access time (>minutes) are stored; storage media includes capacity disks and tape.

For customers having long duration periods, it is needed to limit the HW storage costs. With this tiered solution, a Data Retention system could be configured to store the most recent data (e.g. latest 3 months) in high performance storage devices, while the less recent data (e.g. older than 3 months) could be stored in low performance devices (e.g. SATA disks, tapes, etc.). As a consequence of this solution, if the LEA sends a query request with a wide time range (e.g. 12 months), the response times could be differentiated (e.g. the data related to the latest 3 months could be returned with a response time order of minutes, the older data could be returned with a response time order of hours or even days, depending on the types of storages). The same thing could happen in case of storage differentiation based on the type of service, or on other parameters of the retained data. Accordingly, the LEA will not be aware of when all requested data has been received and this in turn might lead to an uncontrolled processing of data. Furthermore, a Service Level Agreement that has been setup between the network operator and the agency regarding response times might be difficult to verify due to the unpredictable delivering of data from operator to agency. The agency will not be aware of when all the requested data related to a specific subset of the query has been received (e.g. all the data related to the last 3 months only).

A method according to a first embodiment of the invention will now be explained together with FIG. 3. The signaling points DRS 2 and AO 3 have been shown and briefly explained earlier together with previous figures. The Handover Interfaces HIA 7 and HIB 8 have been indicated in FIG. 3. The Handover Interface HIA 7 has according to the invention been enhanced in the first embodiment to deliver results related to specified time segments from DRS to AO.

The method comprises the following steps:

The Authorized Organization 3 sends 31 a request for retained data by specifying a data type together with a retention time range. In this example the data type is Mobile Station International Subscriber Directory Number (MSISDN). MSIDNS is a number used to identify a mobile phone number internationally. This number includes a country code and a National Destination Code. If instead only one MSISDN is of interest to query e.g. MSISDN=+123456789, this number will be sent in the data type field in the request (see for example the prior art document ETSI TS 102 657 V1.7.1 (2010-10)). The retention time range defines the time range during which retained data is desired. In this example the time range=2010-01-01 until 2011-04-01.

In this example the DRS stores the latest three months of data in high performance storage devices i.e. in the storage space 6A. Older data received to DRS is stored in the storage space 6B and even older data is stored in storage space 6C. In this example data retained in DRS from 2011-01-01 until 2011-04-01 is stored in the storage space 6A and data retained in DRS from 2010-01-01 until 2010-12-12 is stored in the storage space 6B. No MSISDN data has been stored in the storage space 6C in this example. According to the invention, the Data Retention System DRS divides 37 the received retention time range into time segments that corresponds to the storage spaces 6A, 6B, 6C. In this example the time range will be divided into the following two segments:

Segment ID 1: 2011-01-01-2011-04-01
Segment ID 2: 2010-01-01-2010-12-12

According to the invention, an acknowledge message is sent 32 from the DRS 2 to the AO 3 over the Handover Interface HIA. The acknowledge message comprises segment identity and response information such as time information corresponding to the identified segment. To be noted is that each access (i.e. read or write operation) to an IO can be milliseconds, seconds, etc. For each query, the result could include hundreds/thousands records and for each record different IO accesses may be required, so the response may be minutes, hours etc. In this example the acknowledge message comprises the following information:

Segment ID=1, Retention time range=2011-01-01-2011-04-01, estimated response time=20 minutes.
Segment ID 2, Retention time range=2010-01-01-2010-12-12, estimated response time=3 hours.

The DRS 2 assembles the requested information for each segment. The requested data i.e. MSISDN retained during the time span 2011-01-01 until 2011-04-01 is hereby fetched from the storage space 6A and sent 33 after approximately 20 minutes in a Res message to the authorized organization 3.

The authorized organization 3 acknowledge that it has received 33 the Res message by sending 34 a response acknowledge message to the data retention system 2.

The requested data i.e. MSISDN retained during the time span 2010-01-01-2010-12-12 is fetched from the storage space 6B and sent 35 after approximately 3 hours in a Res message to the authorized organization 3.

The authorized organization 3 acknowledge that it has received 33 the Res message by sending 36 a response acknowledge message to the data retention system 2.

Due to the fact that the authorized organization in advance was informed of the different response times by the sent 32 acknowledge message, the AO will be able to take measures 38 that facilitate data handling in a controlled manner. The AO can now take actions after receiving 33 because it knows that it is a complete set of data for the limited time range to which it is related.

A method according to a second embodiment of the invention will now be explained together with FIG. 4. The signaling points DRS 2 and AO 3 have been shown and briefly explained earlier together with previous figures. The Handover Interfaces HIA 7 and HIB 8 have been indicated in FIG. 4. The Handover Interface HIA 7 has according to the invention been enhanced in the second embodiment to deliver query results related to specified time segments from DRS to AO. The method comprises the following steps:

The Authorized Organization 3 sends 31 a request for retained data by specifying a data type together with a retention time range. This step has been explained earlier in the first embodiment. In this example the time range=2010-01-01 until 2011-04-01.

Like in the first embodiment, the DRS stores data in the storage spaces. According to the invention, the Data Retention System DRS divides 37 the received retention time range into time segments that corresponds to the storage spaces 6A,6B,6C. Like in the first embodiment, in this example the time range will be divided into the following two segments:

Segment ID 1: 2011-01-01-2011-04-01
Segment ID 2: 2010-01-01-2010-12-12

According to the invention, an acknowledge message is sent 32 from the DRS 2 to the AO 3 over the Handover Interface HIA. This step has been explained earlier in the first embodiment. The acknowledge message comprises segment identity and time information corresponding to the identified segment. In this example the acknowledge message comprises (same as in the first embodiment):

Segment ID=1, Retention time range=2011-01-01-2011-04-01, estimated response time=20 minutes.
Segment ID 2, Retention time range=2010-01-01-2010-12-12, estimated response time=3 hours.

A getstatus request message is according to the invention sent 41 from the authorized organization 3 over HIA to the data retention system 2. The getstatus request message comprises a request for data delivery status of Segment ID 1.

A status reply message is sent 42 from the data retention system 2 to the authorized organization 3. The status reply message comprises the requested data delivery status. In this example the message indicates that data related to the identified segment is ready to be delivered.

A getresult message is sent 43 from the authorized organization 3 to the data retention system. The getresult message comprises a request for the retained data related to the identified segment ready to be delivered.

A status reply message is sent 44 from the at least one data retention system 2 to the authorized organization 3. The status reply message comprises the requested retained data related to the defined segment.

The authorized organization 3 acknowledge that it has received the reply message by sending 45 a response acknowledge message to the data retention system 2.

Figure 4:
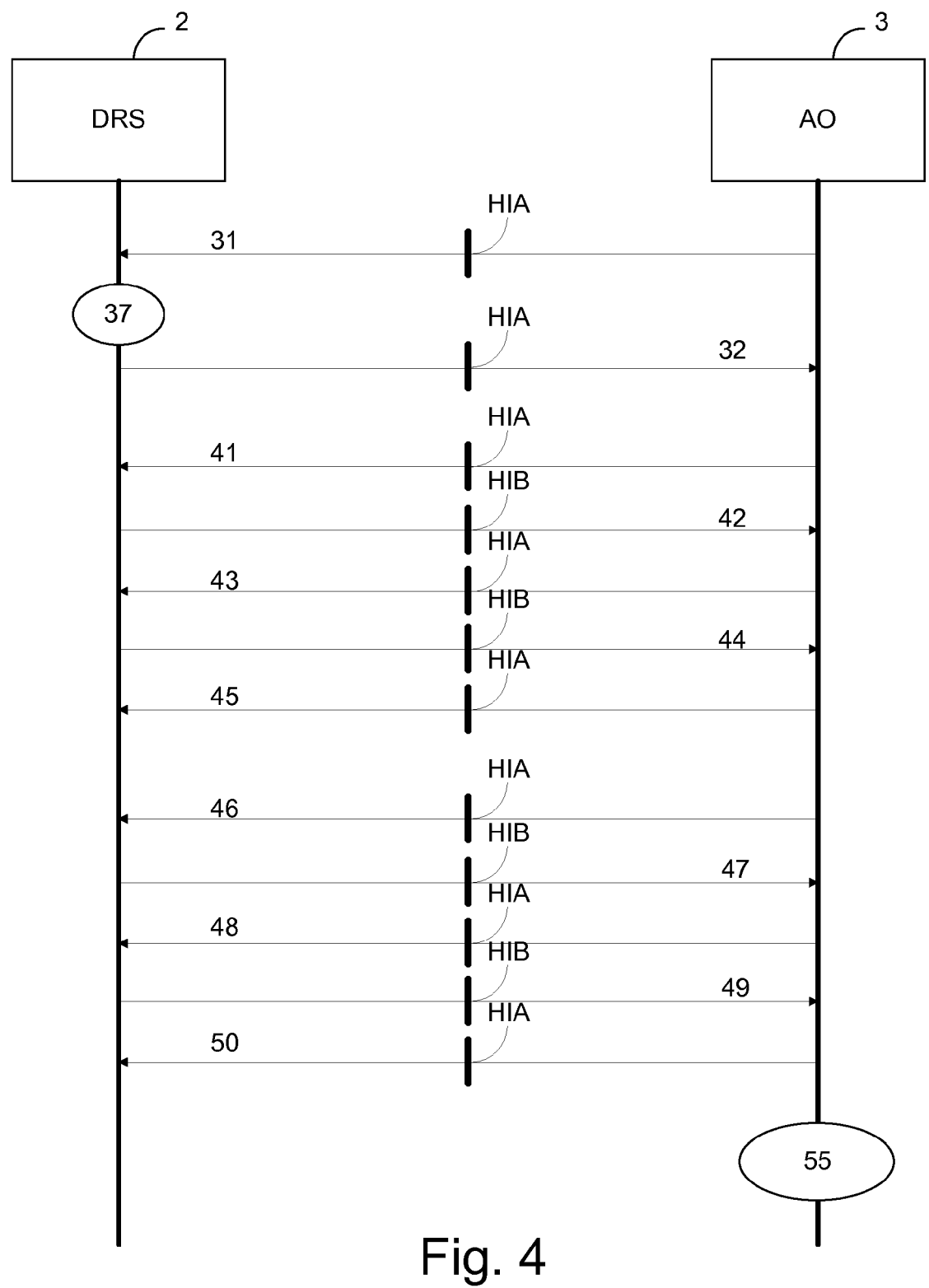
FIG. 4 discloses a signal sequence diagram representing an authorized-organization-initiated mode for collecting, handling and requesting data having different delivering times.

FIG. 4 further discloses steps 46-50. The steps 46-50 are similar to the steps 41-45 described above except that steps 46-50 concerns Segment ID 2 instead of Segment ID 1.

Due to the fact that the authorized organization in advance was informed by the sent 32 acknowledge message of the different response times, the AO can fetch data ready to be delivered and the AO is now able to take measures 55 that facilitate data handling in a controlled and predictable way.

Figure 5:
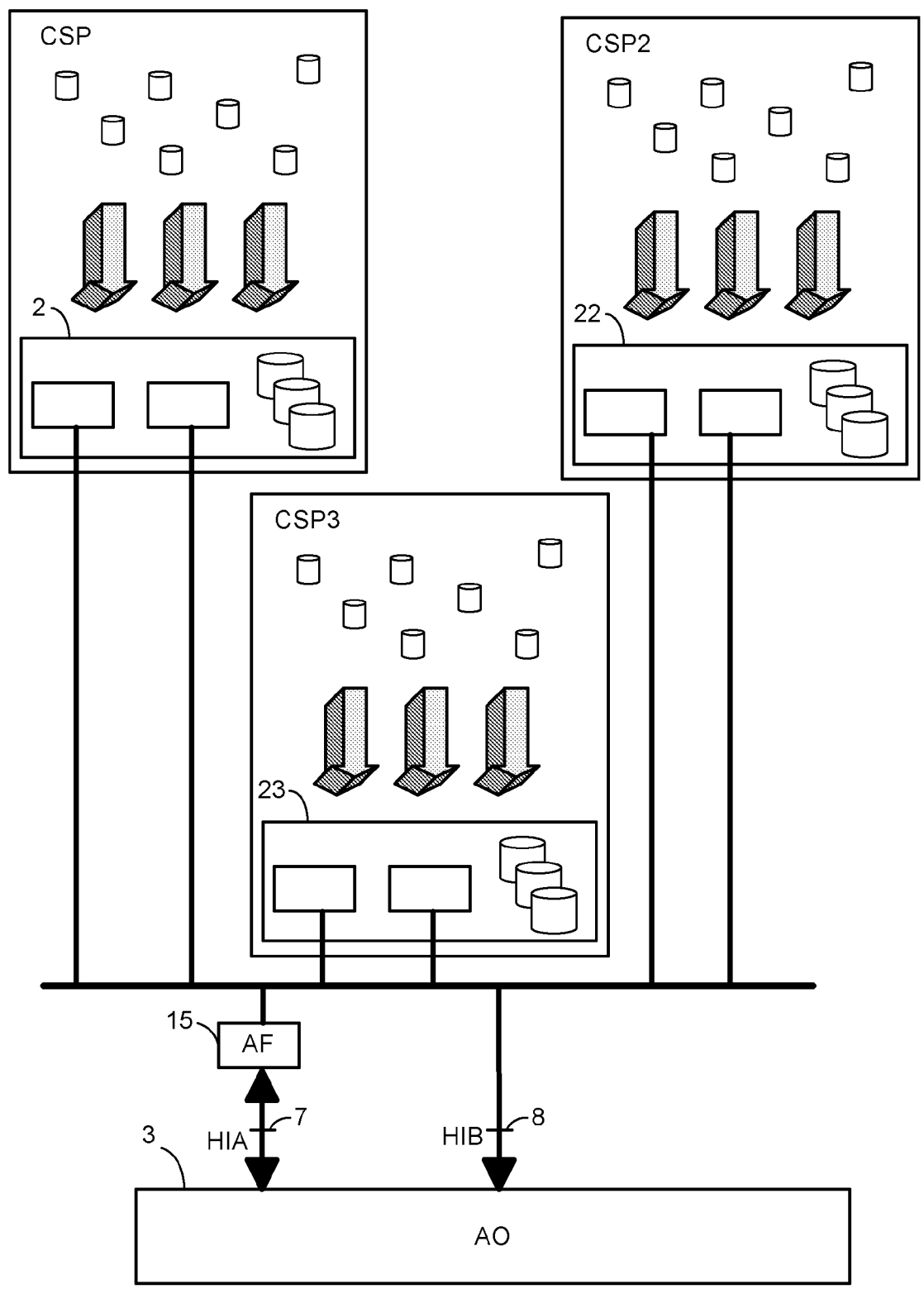
FIG. 5 is a block schematic illustration of Data Retention Systems at Communication Service Providers CSPs attached to an Authorized Organization whereby different storage units in each CSP are acting as data retention sources and wherein storage spaces for retained data in the Data Retention Systems have different defined response times for delivering retained data.
Figure 6:
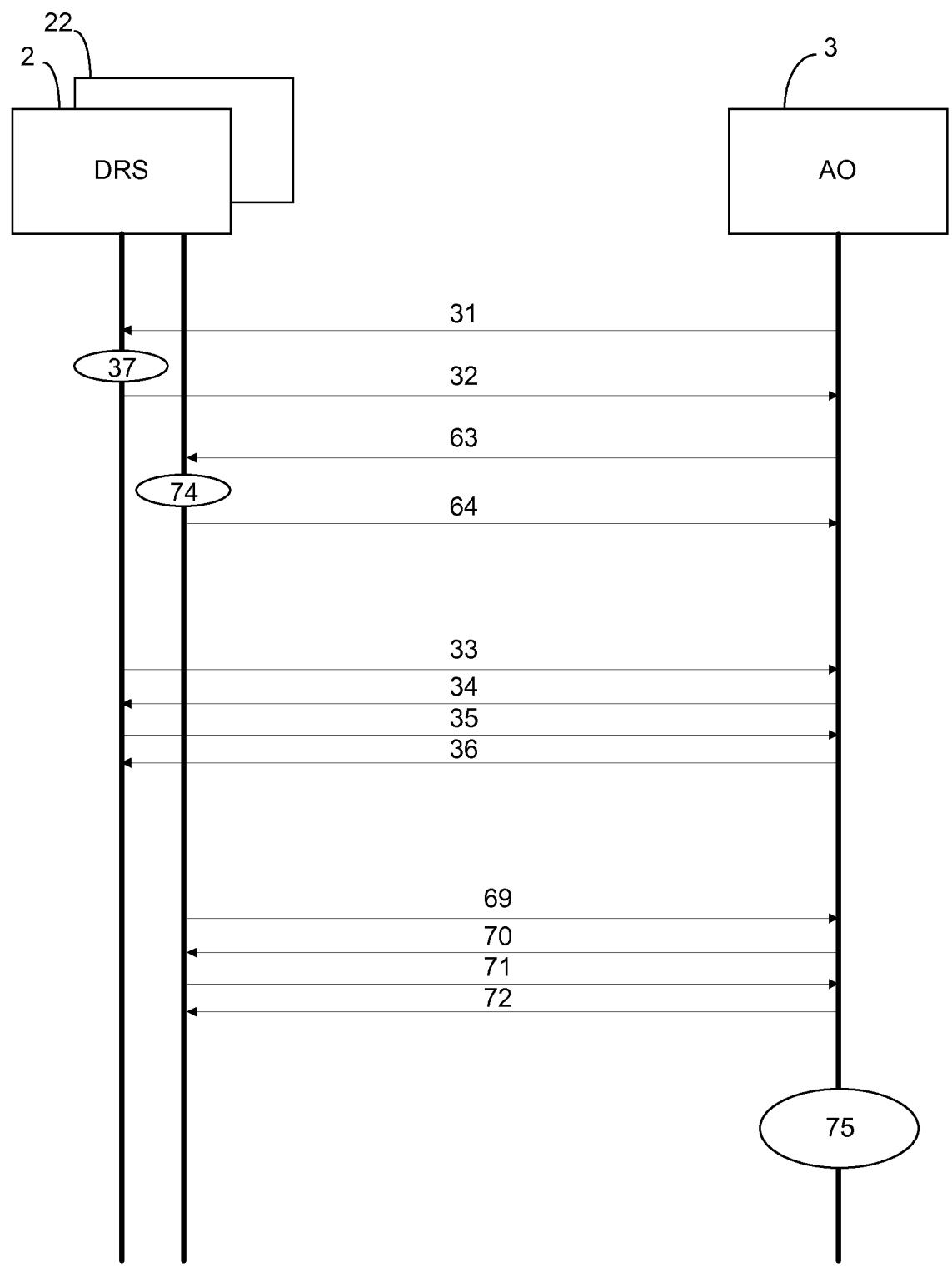
FIG. 6 discloses a signal sequence diagram representing a general mode for collecting and handling of data having different delivering times when different sets of data are stored in different retention systems.

A method according to a third embodiment of the invention will now be explained together with FIGS. 5 and 6. FIGS. 5 and 6 discloses an example when different sets of data are stored in different retention systems and the resulting data from different retention system have different response times.

FIG. 5 discloses the earlier discussed authorized organization AO 3. The authorized organization is in the third embodiment attached to three Communication Service Providers CSP, CSP2 and CSP3. Each CSP is of the same type as the earlier, in FIGS. 1 and 2, discussed CSP. Beyond the Administration Functions AdmFs within each Data Retention Systems DRS 2, 22, 23 used to handle and forward requests from/to the AO, a further Administration Function AF 15 is located between the authorized organization AO 3 and the Data Retention Systems DRSs. The AF 15 distributes requests from/to the AO 3 to/from the Administration Functions in the Data Retention Systems DRS 2, 22, 23. This example comprises so-called "front-end" administration functions to have a unique interface point towards the AO. The same protocol can be used between the two administration functions. In this scenario each CSP DRS will indicate its response time. The "front-end" administration function will report to the AO the different response times for each segment.

Figure 3:
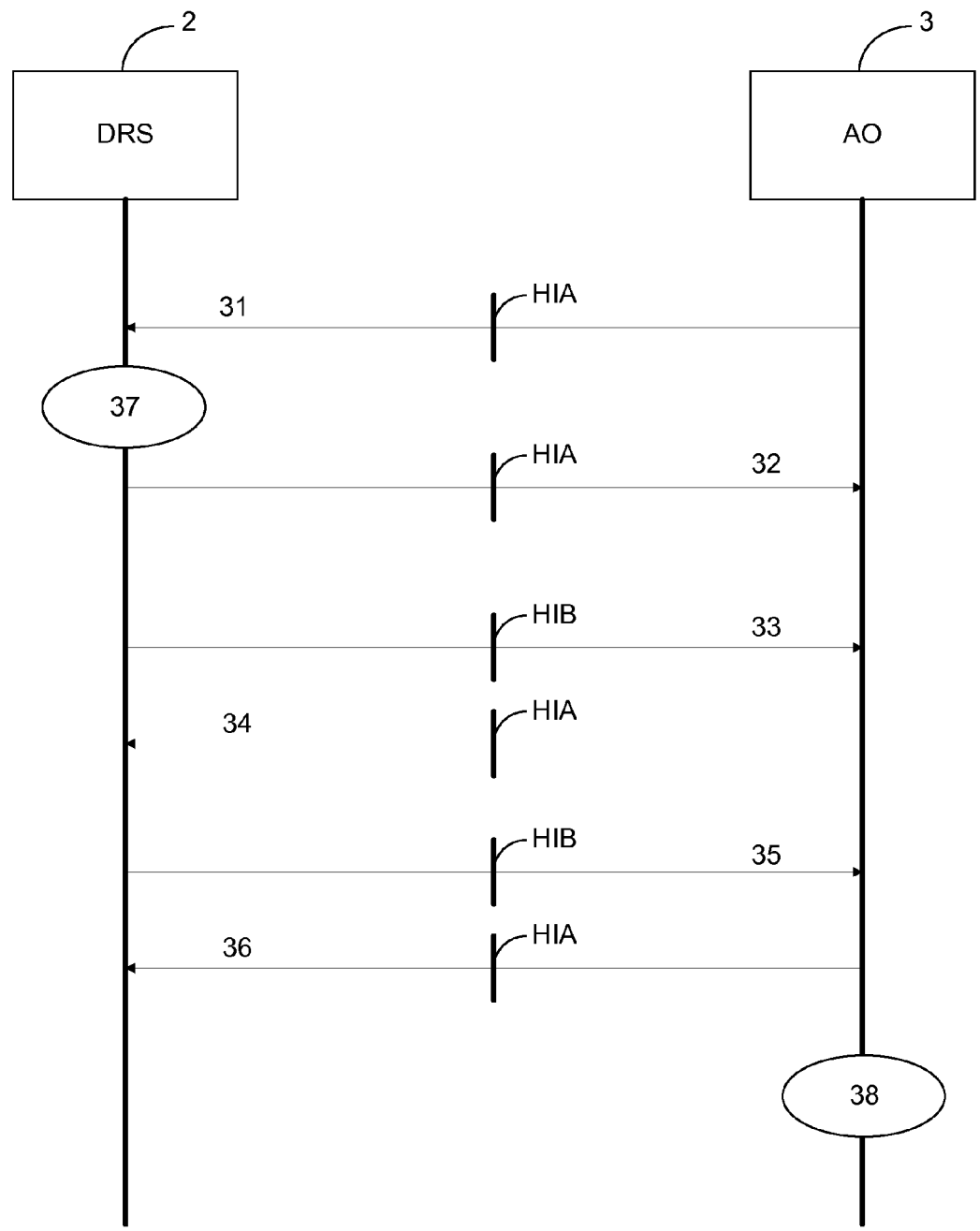
FIG. 3 discloses a signal sequence diagram representing a general mode for collecting and handling of data having different delivering times.

The method according to the third embodiment of the invention will now be briefly explained together with FIG. 6. The signaling points DRS 2, 22 and AO 3 have been shown and briefly explained earlier together with previous figures. The method disclosed in FIG. 6 corresponds to the method disclosed in FIG. 3 but instead of involving only one Data Retention System as in the first embodiment, in the third embodiment two Data Retention Systems 2, 22 are involved. The method comprises the following steps:

The signaling 31-37 are the same as the signaling 31-37 earlier explained together with FIG. 3.
The signaling 63,64,69-70 and 74 corresponds to the signaling 31-37 earlier explained together with FIG. 3 except for the fact that retained data now is received from the Data Retention Systems DRS 22 to the AO 3.
Due to the fact that the authorized organization in advance was informed by the sent 32 and 64 acknowledge message of the different response times, the AO will be able to take measures 75 that facilitate handling of data from several DRS s in a controlled manner.

Figure 7A:
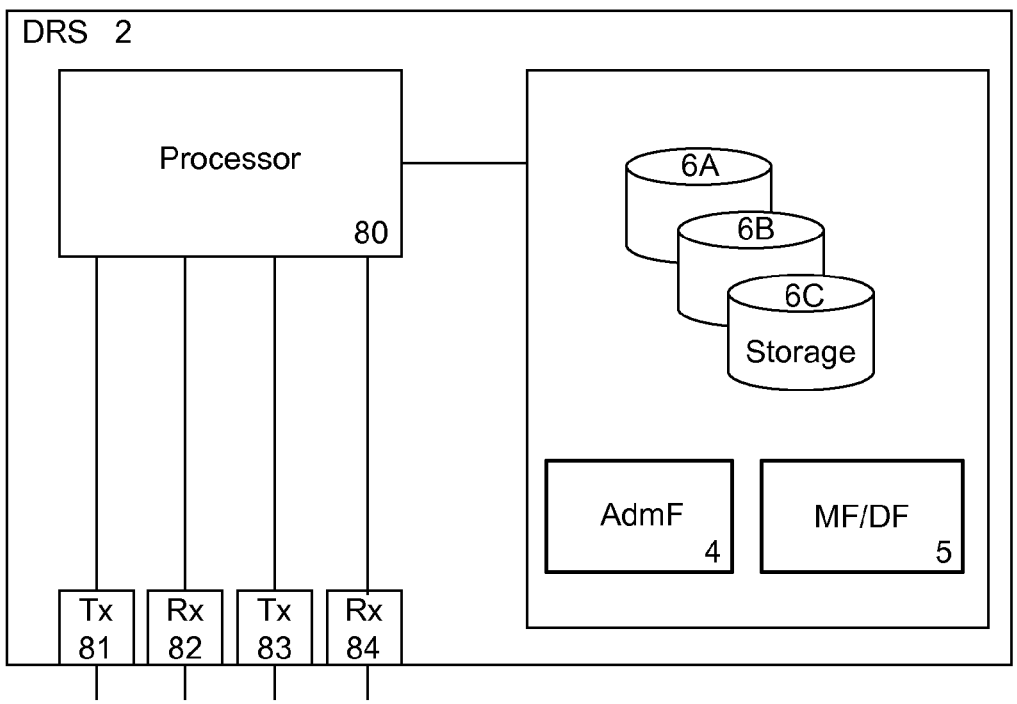
FIG. 7a is a block schematic illustration of a Data Retention Systems according to an embodiment of the invention.

FIG. 7a is a block schematic illustration of a Data Retention Node 2 according to an embodiment of the invention. The node is provided with a transmitter 81 for transmitting messages, such as the acknowledge message comprising segment identity and response information, towards an Authorized Organization over HIA (see FIG. 2), a receiver 82 for receiving messages such as the retention time range from the Authorized Organization over HIA. The node is further provided with transmitter 83 transmitting messages towards the Authorized Organization over HIB (see FIG. 2). The node is further provided with receiver 84 for receiving data from data retention sources. Processor 80 co-ordinates information and messages between the receivers/transmitters and an Administration Function AdmF 4 used to handle and forward requests from/to the AO, and/or a Mediation and Delivery function MF/DF 5 used to mediate and deliver requested information, and/or Storage 6 used to collect and retain data from various Network elements. The processor is further in this example responsible for dividing the received retention time range into at least one time segment.

Figure 7B:
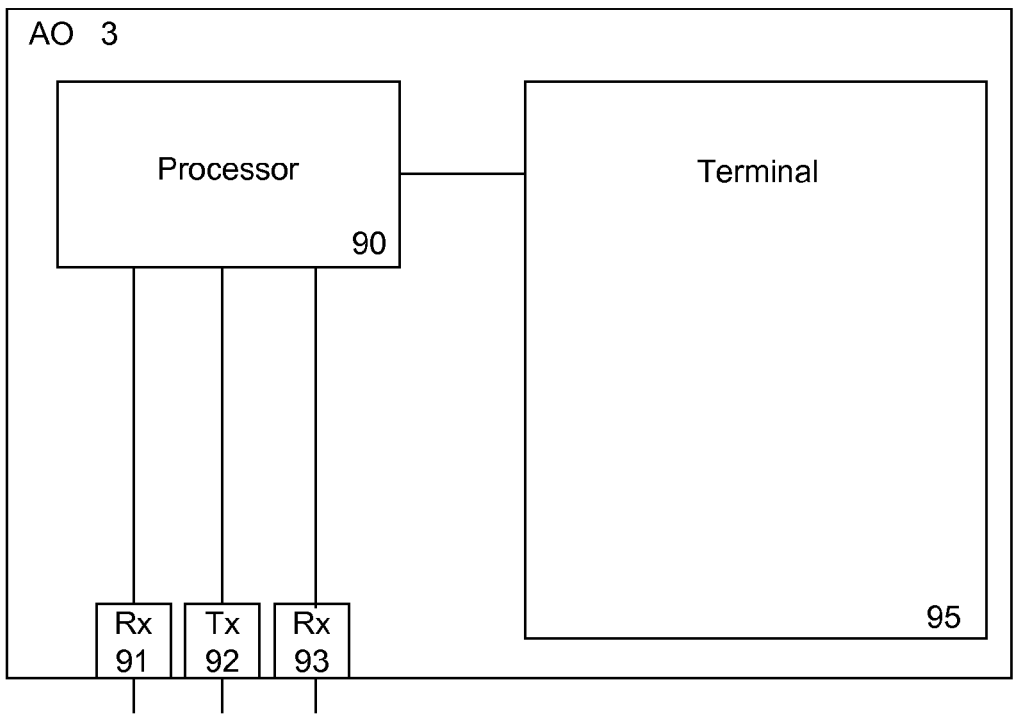
FIG. 7b is a block schematic illustration of an Authorized Organization according to an embodiment of the invention.

FIG. 7b is a block schematic illustration of an Authorization node 3 according to an embodiment of the invention. The node is provided with a receiver 91 and a transmitter 92 for receiving/transmitting messages from/to a Data Retention System over HIA. The node is further provided with receiver 93 for receiving messages from the Data Retention System over HIB. Processor 90 co-ordinates information and messages sent between the receivers/transmitter and a terminal 95 used for example by an agency.

Components of a system that can be used to put the invention into practice are schematically shown in FIGS. 2, 5 and 7. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for handling response times in a communication system, the communication system comprising an authorized organization and at least one data retention system having a plurality of memory storage spaces, each of the plurality of memory storage spaces comprising retained data, wherein the retained data in each of the plurality of memory storage spaces is different from retained data in the other memory storage spaces of the plurality of memory storage spaces, the method comprising:

receiving a request for the retained data from the authorized organization to the at least one data retention system, the request comprising a specified data type and a retention time range, wherein the retention time range is a time range for which the retained data is requested by the authorized organization;

dividing, in the at least one data retention system, the received retention time range into a plurality of time segments corresponding to the plurality of memory storage spaces, wherein each of the plurality of memory storage spaces has a different response time, wherein the division of the received retention time range into the plurality of time segments is based on corresponding response times of each memory storage space of the plurality of memory storage spaces for delivering the retained data, and wherein a response time of a corresponding memory storage space is time elapsed between a time when the retained data is fetched from the corresponding memory storage space and a time when the retained data is delivered from the corresponding memory storage space to the authorized organization; and delivering an acknowledge message from the at least one data retention system to the authorized organization, the acknowledge message comprising estimated response time information and identification information corresponding to the plurality of time segments, wherein the estimated response time information is information related to the response time of the corresponding memory storage space.

2. The method for handling response times of claim 1, wherein the delivering the acknowledge message comprises delivering the acknowledge message through a Handover Interface A (HIA).

3. The method for handling response times of claim 1, further comprising delivering, from the at least one data retention system to the authorized organization, the requested retained data related to the plurality of time segments.

4. The method for handling response times of claim 1, further comprising:

sending a getstatus request message from the authorized organization to the at least one data retention system, the getstatus request message comprising a request for data delivery status of one of the plurality of time segments; and sending a first status reply message from the at least one data retention system to the authorized organization, the first status reply message comprising the requested data delivery status of the one of the plurality of time segments.

5. The method for handling response times of claim 4, further comprising:

receiving the first status reply message at the authorized organization, the first status reply message indicating that the corresponding retained data related to the one of the plurality of time segments is ready to be delivered;

sending a getresult message from the authorized organization to the at least one data retention system, the getresult message comprising a request for the corresponding retained data related to the one of the plurality of time segments; and sending a second status reply message from the at least one data retention system to the authorized organization, the second status reply message comprising the requested corresponding retained data related to the one of the plurality of time segments.

6. The method for handling response times of claim 4, wherein the getstatus request message is delivered through a Handover Interface A (HIA).

7. The method for handling response times of claim 1, wherein storage differentiation of the retained data in the plurality of memory storage spaces is based on a type of service.

8. The method for handling response times of claim 1, wherein the acknowledge message is delivered prior to a delivery of the requested retained data related to the plurality of time segments.

9. A computer program product stored in a non-transitory computer readable medium for handling response times in a communication system, the communication system comprising an authorized organization and at least one data retention system having a plurality of memory storage spaces, each of the plurality of memory storage spaces comprising retained data, wherein the retained data in each of the plurality of memory storage spaces is different from retained data in the other memory storage spaces of the plurality of memory storage spaces, the computer program product comprising software instructions which, when run on one or more processing circuits, causes the one or more processing circuits to:

receive a request for the retained data from the authorized organization to the at least one data retention system, the request comprising a specified data type and a retention time range, wherein the retention time range is a time range for which the retained data is requested by the authorized organization;

divide, in the at least one data retention system, the received retention time range into a plurality of time segments corresponding to the plurality of memory storage spaces, wherein each of the plurality of memory storage spaces has a different response time, wherein the division of the received retention time range into the plurality of time segments is based on corresponding response times of each memory storage space of the plurality of memory storage spaces for delivering the retained data, and wherein a response time of a corresponding memory storage space is time elapsed between a time when the retained data is fetched from the corresponding memory storage space and a time when the retained data is delivered from the corresponding memory storage space to the authorized organization; and deliver an acknowledge message from the at least one data retention system to the authorized organization, the acknowledge message comprising estimated response time information and identification information corresponding to the plurality of time segments, wherein the estimated response time information is information related to the response time of the corresponding memory storage space.

10. A node of a communication system, the node implementing a Data Retention function, the communication system comprising a plurality of memory storage spaces, each of the plurality of memory storage spaces comprising retained data, wherein the retained data in each of the plurality of memory storage spaces is different from retained data in the other memory storage spaces of the plurality of memory storage spaces, the node comprising:

a receiver configured to receive a request for the retained data, the request comprising a specified data type and a retention time range, wherein the retention time range is a time range for which the retained data is requested by an authorized organization;

a processing circuit configured to divide the received retention time range into a plurality of time segments corresponding to the plurality of memory storage spaces, wherein each of the plurality of memory storage spaces has a different response time, wherein the division of the received retention time range into the plurality of time segments is based on corresponding response times of each memory storage space of the plurality of memory storage spaces for delivering the retained data, and wherein a response time of a corresponding memory storage space is time elapsed between a time when the retained data is fetched from the corresponding memory storage space and a time when the retained data is delivered from the corresponding memory storage space to the authorized organization; and a transmitter configured to deliver an acknowledge message, the acknowledge message comprising estimated response time information and identification information corresponding to the plurality of time segments, wherein the estimated response time information is information related to the response time of the corresponding memory storage space.

11. The node of claim 10, wherein the transmitter is configured to deliver the acknowledge message through a Handover Interface A (HIA).

12. The node of claim 10, wherein the receiver is further configured to receive a getstatus request message comprising a request for delivery status.

13. The node of claim 12, wherein the getstatus request message is received through a Handover Interface A (HIA).

14. A node of a communication system, the node implementing an authorization function, the node comprising:

a processor communicatively coupled to a memory, the processor configured to cause:

a transmitter to send a request for retained data stored in a plurality of memory storage spaces of a data retention system, wherein the retained data in each of the plurality of memory storage spaces is different from retained data in the other memory storage spaces of the plurality of memory storage spaces, the request comprising a specified data type and a retention time range, wherein the retention time range is a time range for which the retained data is requested by an authorized organization;

a receiver to receive an acknowledge message, the acknowledge message comprising estimated response time information and identification information corresponding to a plurality of time segments, wherein the plurality of time segments correspond to the plurality of memory storage spaces, wherein each of the plurality of memory storage spaces has a different response time, wherein the plurality of time segments are divided from the transmitted retention time range based on corresponding response times of each memory storage space of the plurality of memory storage spaces for delivering the retained data, and wherein a response time of a corresponding memory storage space is time elapsed between a time when the retained data is fetched from the corresponding memory storage space and a time when the retained data is delivered from the corresponding memory storage space to the authorized organization, and wherein the estimated response time information is information related to the response time of the corresponding memory storage space.

15. The node of claim 14, wherein the receiver receives the acknowledge message through a Handover Interface A (HIA).

16. The node of claim 14, wherein the transmitter further sends a getstatus request message comprising a request for delivery status.

17. The node of claim 16, wherein the transmitter sends the getstatus request message through a Handover Interface A (HIA).

* * * * *